UNITED STATES PATENT OFFICE.

THOMAS P. MURPHY, OF NEW ORLEANS, LOUISIANA, ASSIGNOR OF FIVE-SIXTHS TO J. WILLIAM BARKDULL, NICHOLAS D. McDONALD, EDGAR H. BRIGHT, SAMUEL S. JONES, AND FRANK EMMETT, OF SAME PLACE.

METHOD OF AND COMPOSITION FOR FILLING HOLLOW NOISELESS CAR-WHEELS, &c., WITH NON-RESONANT MATERIAL.

SPECIFICATION forming part of Letters Patent No. 564,215, dated July 21, 1896.

Application filed April 28, 1896. Serial No. 589,465. (No model.)

*To all whom it may concern:*

Be it known that I, THOMAS P. MURPHY, a citizen of the United States, residing at New Orleans, in the parish of Orleans and State of Louisiana, have invented certain new and useful Improvements in Methods of and Composition for Filling Hollow Noiseless Car-Wheels or other Like Bodies with Non-Resonant Material; and I do hereby declare the following to be a full, clear, and exact description of the invention, such as will enable others skilled in the art to which it appertains to make and use the same.

My invention relates to improvements in methods of and compounds for filling hollow car-wheels or other like bodies with non-resonant material.

The invention is especially intended to provide a method of and a compound for filling the noiseless car-wheel described in my Patent No. 554,526, granted February 11, 1896, or in my application, Serial No. 571,139, filed December 5, 1895.

In order to make the compound, I dissolve a mixture of about one hundred pounds of coal-tar and ten pounds of crude asphalt at a temperature of about 212° Fahrenheit. Into this I mix about twenty pounds of rosin-oil and heat the mixture to a temperature of about 300° Fahrenheit. In the meantime the hollow portion of the car-wheel is filled with water, and into this water the fused composition is poured. This composition, being heavier than water, settles rapidly in the hollow portion of the wheel, expelling the water and steam through the orifice and the composition chilling rapidly becomes spongy and non-resonant, filling up all of the hollow portion of the car-wheel and rendering the same practically noiseless.

Instead of chilling the composition by pouring it into water in the car-wheel, as described, it may be poured direct into the hollow portion of the car-wheel, and the chilling may be effected by immersing the wheel in water or by spraying water upon it. Moreover, the compound may be poured into a separate vessel containing water first and then remelted and poured into the car-wheel, where it may be chilled as before.

I do not mean to limit myself to the precise proportions and temperature stated, as variations might be made in these without materially affecting the operation of the invention.

Having thus described my invention, what I claim, and desire to secure by Letters Patent of the United States, is—

1. A composition for use in noiseless car-wheels and like purposes, consisting of coal-tar, asphalt and rosin-oil, mixed together in such proportions as to constitute a spongy and non-resonant mass.

2. A hollow noiseless car-wheel filled with a fused mixture of coal-tar, asphalt and rosin-oil, substantially as described.

3. The method of filling hollow car-wheels with non-resonant material, which consists in filling the hollow portion of a car-wheel with water and pouring a fused mixture of coal-tar, asphalt and rosin-oil into the car-wheel, replacing the water and chilling the mixture, substantially as described.

In testimony whereof I affix my signature in presence of two witnesses.

THOMAS P. MURPHY.

Witnesses:
JOHN H. HOLT,
J. STEPHEN GIUSTA.